Figure 1:
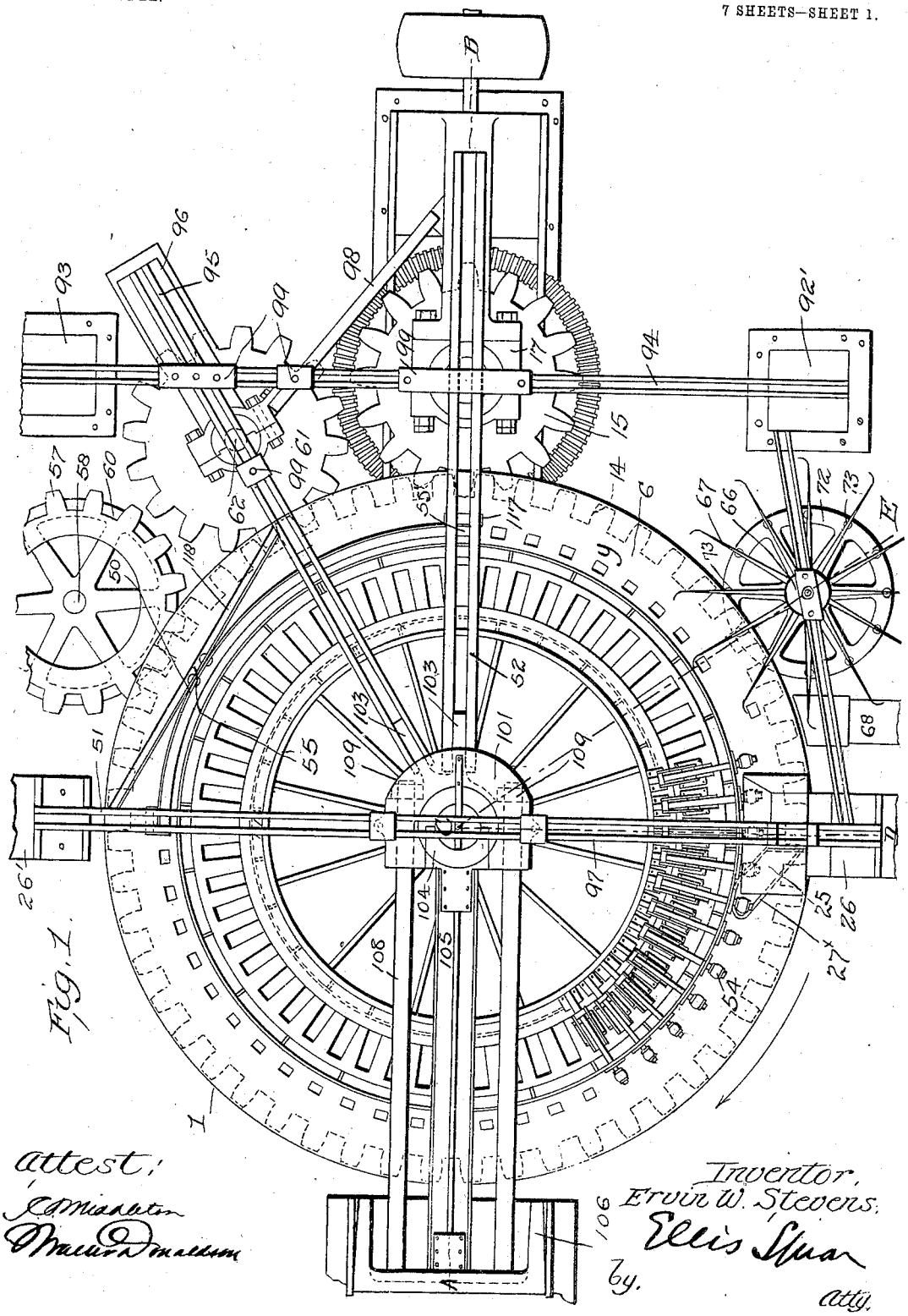

No. 726,475. PATENTED APR. 28, 1903.
E. W. STEVENS.
MACHINE FOR MOLDING PLASTIC MATERIAL.
APPLICATION FILED SEPT. 16, 1902.
NO MODEL. 7 SHEETS—SHEET 1.

Attest:
Inventor,
Ervin W. Stevens,
by
Atty.

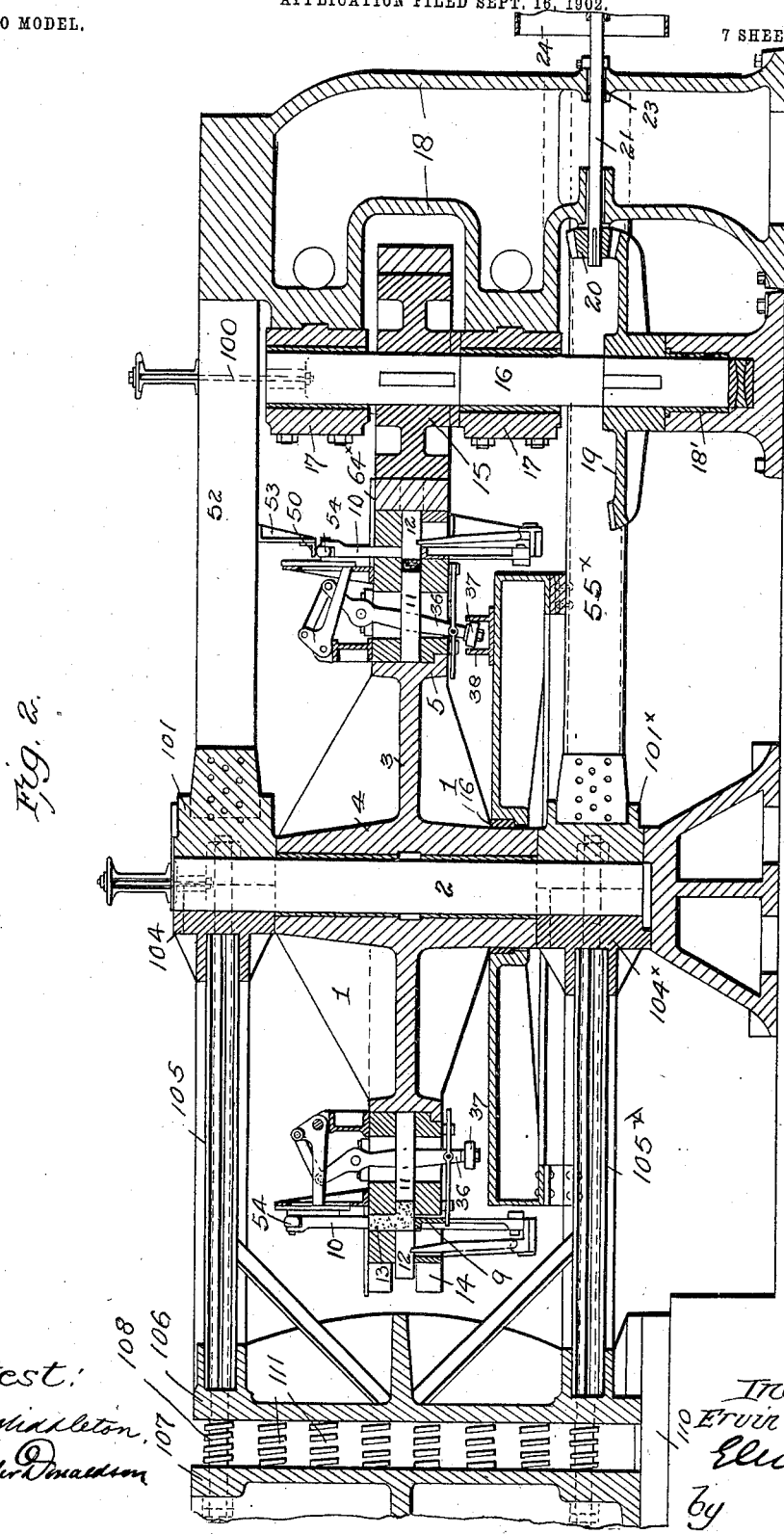

No. 726,475. PATENTED APR. 28, 1903.
E. W. STEVENS.
MACHINE FOR MOLDING PLASTIC MATERIAL.
APPLICATION FILED SEPT. 16, 1902.
NO MODEL. 7 SHEETS—SHEET 3.
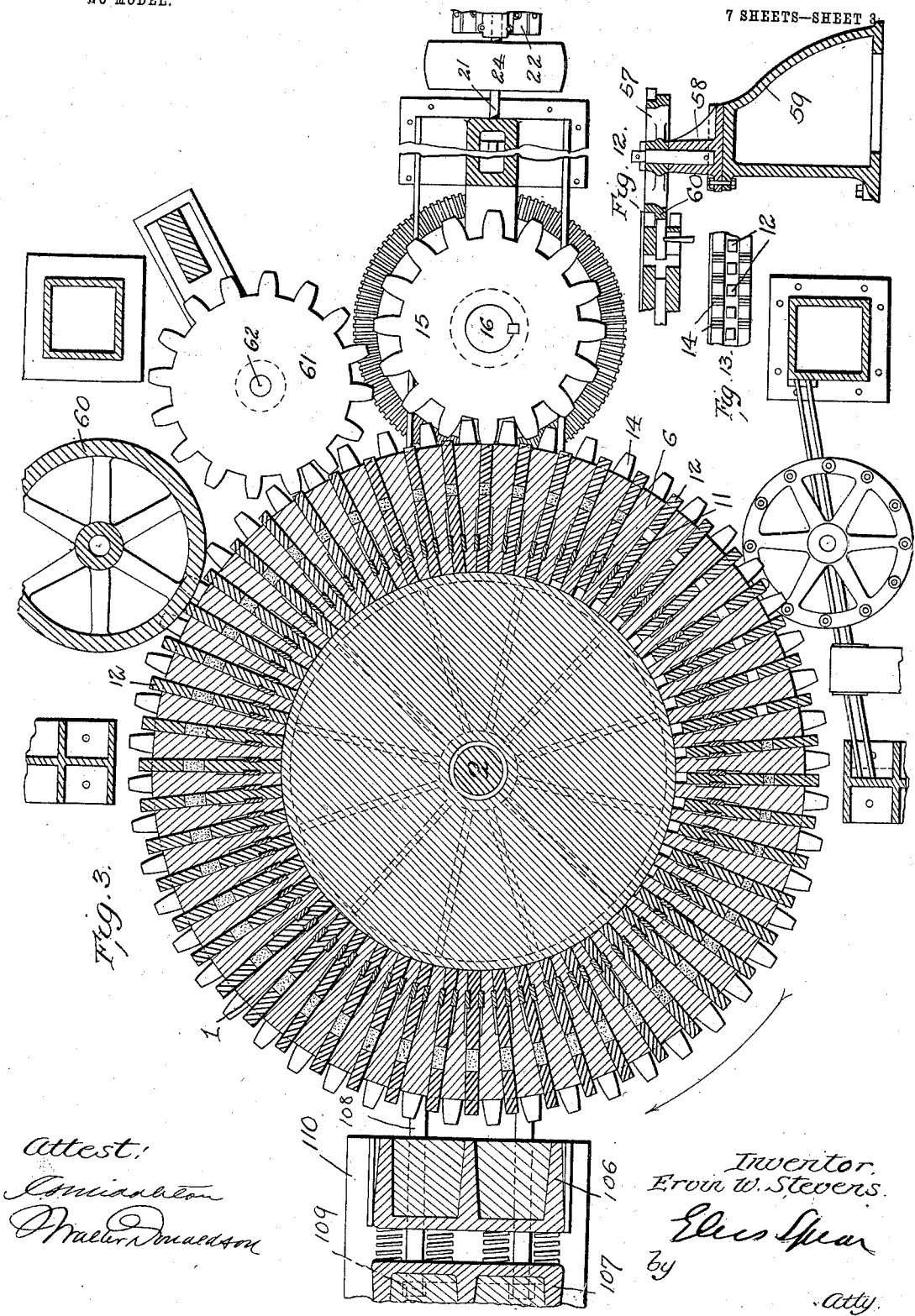
Attest:
Inventor.
Ervin W. Stevens.

No. 726,475. PATENTED APR. 28, 1903.
E. W. STEVENS.
MACHINE FOR MOLDING PLASTIC MATERIAL.
APPLICATION FILED SEPT. 16, 1902.
NO MODEL.
7 SHEETS—SHEET 4.
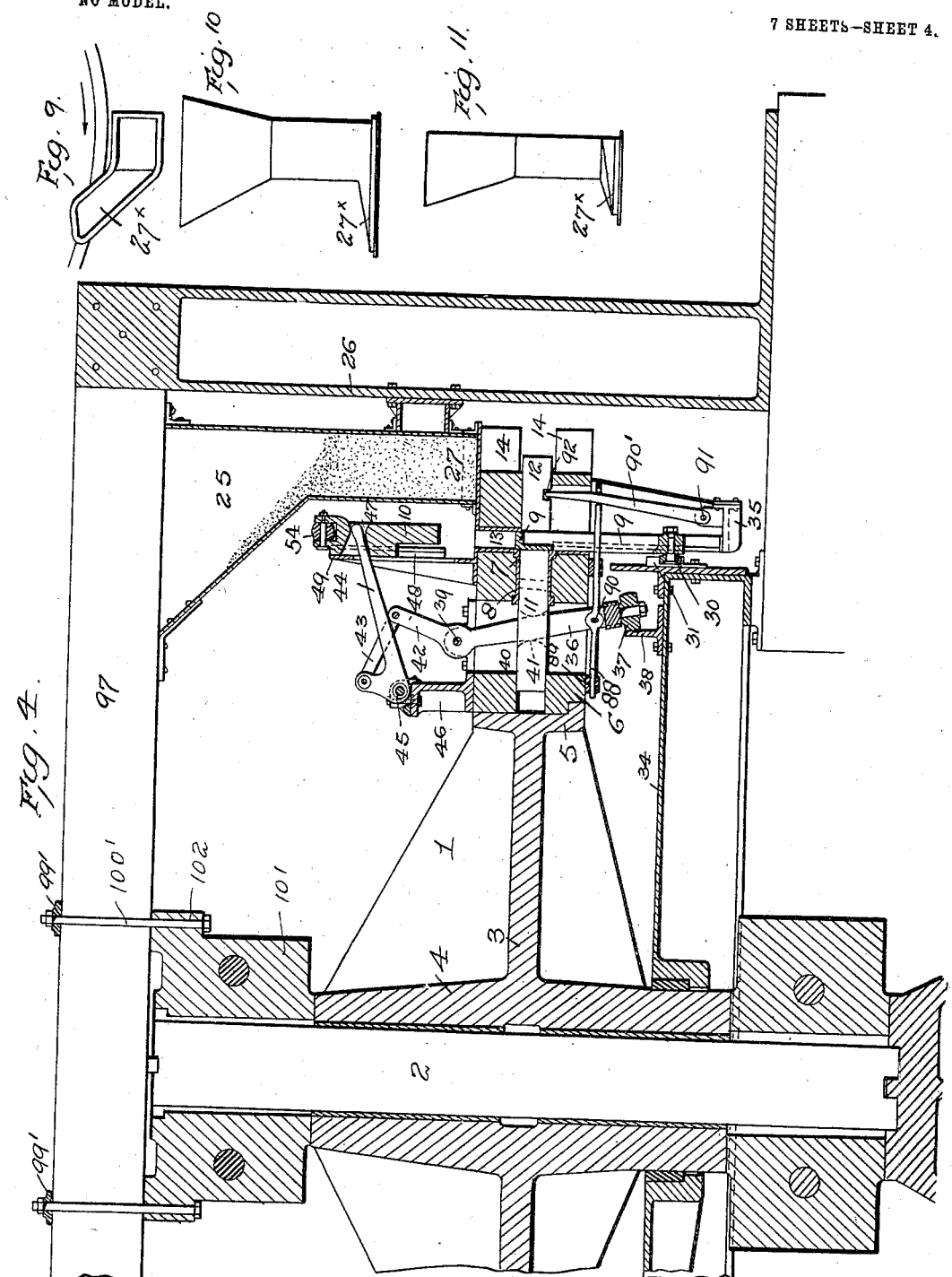

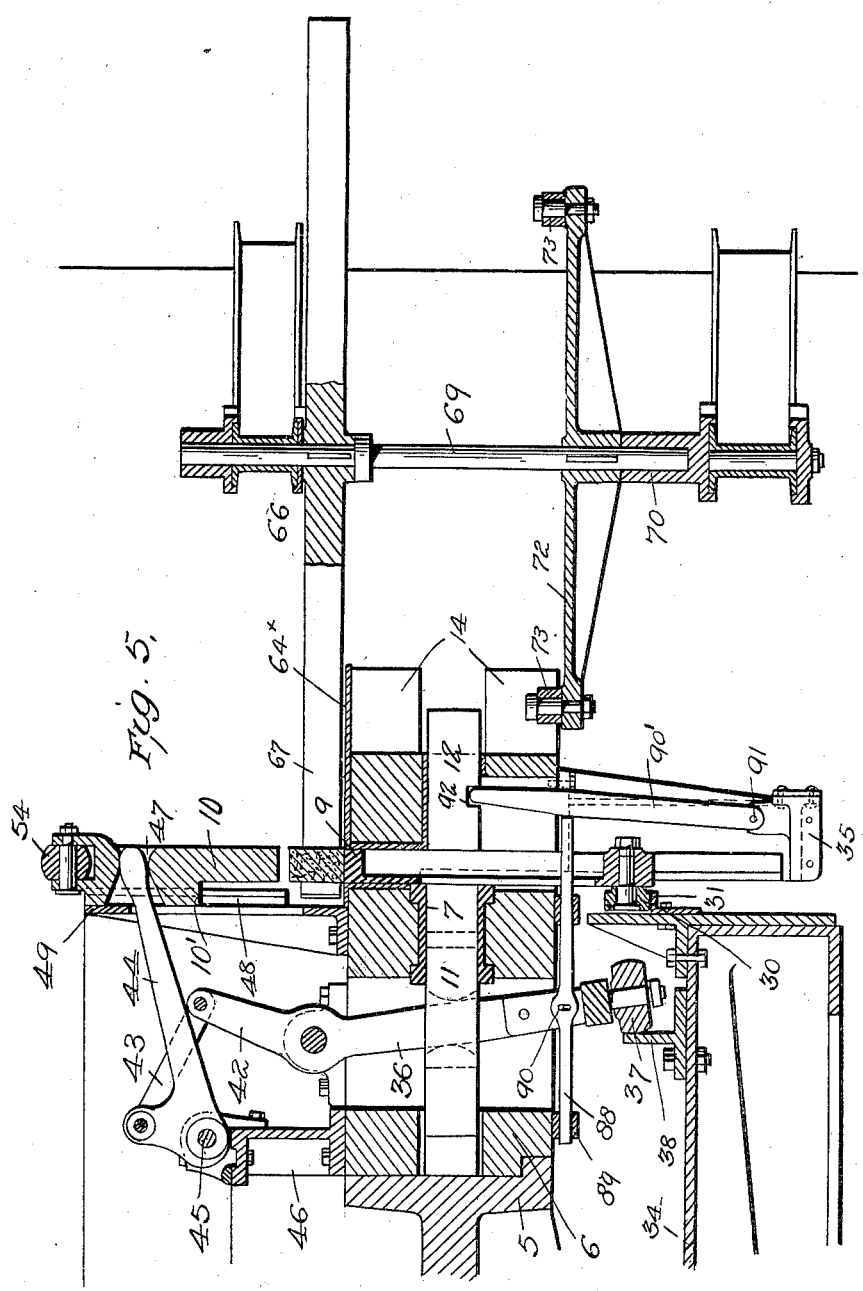

No. 726,475. PATENTED APR. 28, 1903.
E. W. STEVENS.
MACHINE FOR MOLDING PLASTIC MATERIAL.
APPLICATION FILED SEPT. 16, 1902.
NO MODEL. 7 SHEETS—SHEET 6.
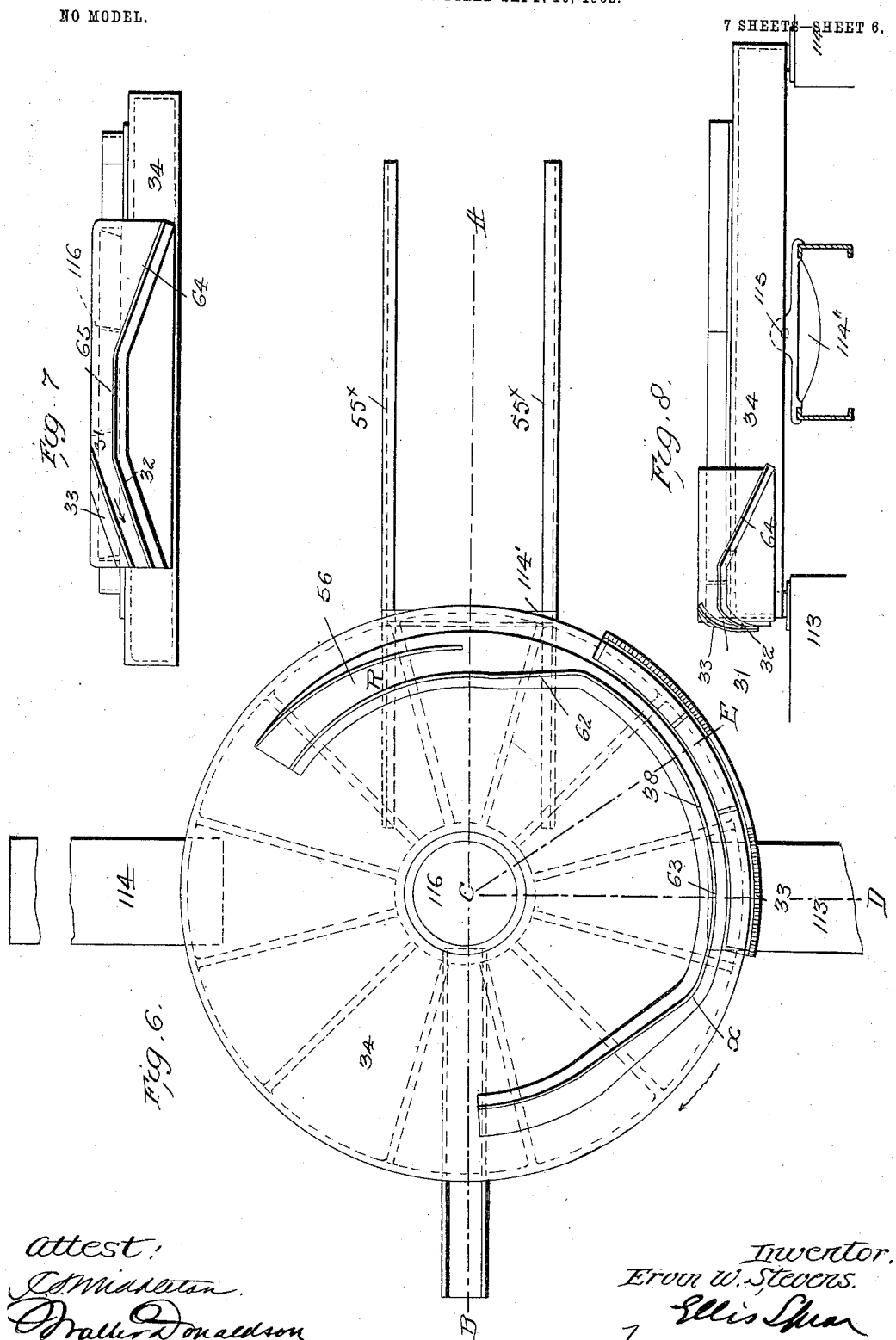

No. 726,475.
PATENTED APR. 28, 1903.
E. W. STEVENS.
MACHINE FOR MOLDING PLASTIC MATERIAL.
APPLICATION FILED SEPT. 16, 1902.
NO MODEL.
7 SHEETS—SHEET 7.
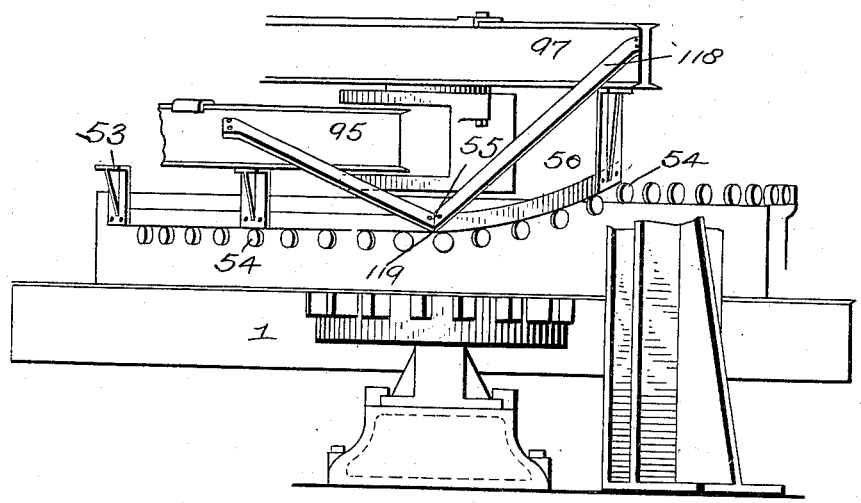
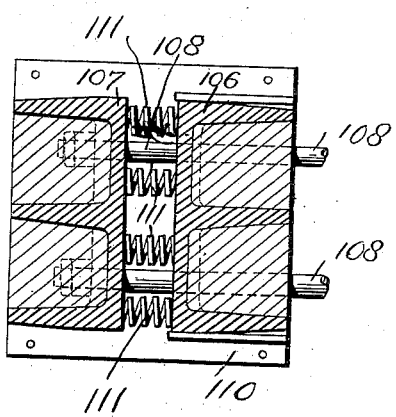
Attest:
Inventor
Ervin W. Stevens.
by
Atty.

UNITED STATES PATENT OFFICE.

ERVIN W. STEVENS, OF PHILADELPHIA, PENNSYLVANIA.

MACHINE FOR MOLDING PLASTIC MATERIAL.

SPECIFICATION forming part of Letters Patent No. 726,475, dated April 28, 1903.

Application filed September 16, 1902. Serial No. 123,604. (No model.)

*To all whom it may concern:*

Be it known that I, ERVIN W. STEVENS, a citizen of the United States, residing at Philadelphia, Pennsylvania, have invented certain new and useful Improvements in Machines for Molding Plastic Material, of which the following is a specification.

My invention is designed for compressing material for the production of artificial stone.

In the manufacture of artificial-stone blocks and the like, which are pressed to the required hardness without subsequent burning, a greater pressure is required than in the manufacture of ordinary building-bricks, which are merely shaped by pressure and are hardened by burning.

My invention, while particularly designed for producing artificial stone requiring great pressure, is not, of course, limited in this respect, as it may be used in the manufacture of other articles, if desired.

My object is to provide a machine capable of producing the stone blocks rapidly and with a minimum expenditure of power.

In many machines the reciprocating parts used in the pressing operations are of large proportions and of great weight, requiring a large force to operate them. Again, it has been customary to so arrange the working parts that the rubbing or frictional surfaces under heavy pressure have an extensive movement of translation the one over the other. In my machine I aim to avoid both of these objections by making the reciprocating parts small and light and also by reducing the movement of translation of one part over the other to a minimum.

In the accompanying drawings, Figure 1 is a plan view of the machine with parts omitted. Fig. 2 is a sectional view along the line A B, Fig. 1. Fig. 3 is a plan view with parts in section and parts omitted. Fig. 4 is a detail sectional view on line C D of Fig. 1. Fig. 5 is a detail sectional view taken along the line C E of Fig. 1. Fig. 6 is a plan view of the operating-cams of the machine and the platform supporting them. Fig. 7 is a side view of Fig. 6. Fig. 8 is a detail sectional view showing the platform with the cams in side elevation. Figs. 9, 10, and 11 are detail views of the feed-hopper. Figs. 12 and 13 are detail views. Fig. 14 is a detail view in the nature of a diagram. Fig. 15 is a further detail view.

The machine comprises generally a rotating mold-wheel 1, horizontally disposed and turning about an upright shaft 2, supported as will be hereinafter described. The mold-wheel is composed of a central spider 3, having a hub 4 to turn on the upright shaft and a flange 5, which supports the mold-ring 6, in which the mold-cavities 7 are radially arranged, said cavities being located at different points around the wheel and being of any desired number. In the present case there are supposed to be fifty-two of these mold-cavities. Each of these mold-cavities is lined with steel in the mold proper and Babbitt metal in the other cavities, as shown in Fig. 4. Coöperating with each of these mold-cavities is a set of plungers marked 9, 10, 11, and 12. Those marked 11 and 12 operate in a direction axially of the radial mold-cavities, while those marked 9 and 10 operate vertically in an opening 13, which communicates with the mold-cavity. These several plungers operate to compress the material to a sufficient hardness to serve all the purposes for which artificial stone are used, and their order of operation will be hereinafter described.

The mold-table, as shown in Figs. 1 and 3, is provided with teeth 14 on the periphery of the ring 6, and the mold-wheel is driven by a gear-wheel 15, the teeth of which mesh with the teeth 14 of the mold-wheel. The gear-wheel 15 is keyed to a vertical shaft 16, journaled in bearings 17 of a standard 18, the lower end of said shaft being stepped in a bearing 18', bolted to any suitable supporting base or platform. The shaft 16 is driven through a beveled gear 19 thereon, with which meshes a beveled pinion 20, carried by a shaft 21, journaled in bearings 22 23, and having keyed thereto the drive-pulley 24. The mold-wheel turns in the direction of the arrow, Fig. 3, and thus the vertical openings 13, leading to the mold-cavities 7, are brought in succession to the point where the material from which the blocks are to be made is fed downwardly into the said openings 13. The material is contained in a hopper 25, supported by a standard 26. The material is of such consistency that it will feed downwardly by its own weight and also by the suction created by the plungers 9 as they move downwardly, so that each time one of the openings 13 passes beneath the open lower end of the discharge spout or chute 27 a charge of material will be received in the said opening. The spout or chute has a laterally-extended foot 27×, which acts like a trowel to force the mortar-like material into the openings 13. This charge of material rests upon the upper end of the vertically-arranged plunger 9, which at this time, as shown in Fig. 4, is located with its upper surface slightly above the mold-cavity 7. The lower end of this plunger is provided with an antifriction-roller 30, which at the moment the feed of the charge into the opening 13 takes place is in engagement with the cam groove or way 31, Figs. 4 and 7, by which the said plunger is being gradually lowered as the mold-wheel turns, it being understood that the camway is formed between the angle-iron rails 32 33, fixed to a platform 34, which is stationary in relation to the rotary movement of the mold-wheel. The feeding in of the charge continues as long as the downward movement of the plunger 9 continues, and is due to the combined effect of gravity and the suction arising from the descending plunger 9.

During the feeding action, as above stated, the roller 30 moves down the camway 31 in the direction of the arrow, Fig. 7, and when the roller leaves the said camway the plunger 9 is then in its lowermost position and is resting with its lower end upon a bracket 35, which is bolted to the lower side of the mold-wheel. The position of the plunger 9 after the feeding-in action has taken place is illustrated on the left-hand side of Fig. 2, from which it will be seen that the upper edge is flush with the lower side or edge of the mold-cavity.

While the plunger 9 is descending, as just described, the resistance block or plunger 11 occupies the position shown in Fig. 4, with its front face in the same vertical plane with the inner side of the vertical opening 13, it being held in this position because the lever 36, which is in engagement with and operates the resistance-block 11, is held in its advanced position of Fig. 4 by a roller 37 on its lower end engaging a cam-bar or angle-iron 38, secured to the relatively fixed platform 34. The relation between the cam 38 and the cam 31 will be seen from Figs. 6 and 7, it being understood that the mold-wheel is rotating in the direction of the arrow, Fig. 6. When the roller 37 reaches the point x on the cam 38, the lever 36 will by its own gravity and by the weight of the parts connected therewith begin to swing inwardly, and thus retract the resistance-block to the position shown on the left of Fig. 2. Its front end will now be located at a point in rear of the vertical opening 13. Some of the material, as shown in Fig. 2, has followed the retracting movement of the resistance-block 11, due to the suction exerted thereby, some of said material lying loosely in the mold-cavity and some of it extending up into the vertical opening 13. The lever 36 is pivoted, as shown at 39, to the mold-wheel, and it extends down through an opening 40 in the said wheel, and it is bifurcated so as to engage the opposite sides of the resistance-plunger, as shown at 41 in Fig. 4. This double lever has the arms 42, extending above its pivot, connected by links 43 with an arm of a lever 44, pivoted at 45 to a cast-iron ring 46, bolted to the upper surface of the mold-wheel. The free end of the lever 44 extends into a conical opening 47 of the vertical compressing-plunger 10, which is arranged to slide vertically on ways 48, supported upon a ring or flange 49, bolted to the upper surface of the mold-wheel. The plunger 10 descends as the resistance block or plunger 11 retracts, and, as shown on the left of Fig. 2, it rests upon the upper surface of the charge of material which now lies between it and the end of the resistance block or plunger 11. The uppermost position of the plunger 10 is shown in Fig. 4, and its movement from this uppermost position to its intermediate position (shown on the left of Fig. 2) takes place after the vertical opening 13 belonging to that plunger has received its charge and has passed away from the hopper, which is arranged centrally over the line D C, Fig. 6. The position of the parts shown at the left of Fig. 2 is that which they assume when the wheel by its rotation in the direction of the arrow has carried the said parts over the plane or line B C, Fig. 6. At this time the roller 37 of the resistance-block lever 36 is free from the cam 38, which cam from the point x, Fig. 6, inclines inwardly.

As before stated, when the parts are in the position shown on the left of Fig. 2 the material has been slightly compressed by the action of the vertical compressing-plunger 10. The continued movement of the mold-wheel in the direction of the arrow will carry the parts described a quarter-turn around to the beginning of a cam 50. This cam is of segmental form and extends one-quarter way around the mold-wheel and above the same. It is supported from the beams or trusses 51 52 by means of brackets 53, Fig. 2, and it is in the path of a roller 54, journaled at the top of the vertical compressing-plunger 10, so that as this roller comes around and contacts with the cam-bar 50 it, with the compressing-plunger 10, will be forced downwardly by the sloping under side of this cam-bar. This cam-bar inclines downwardly on its under side from its front end, or the end which is attached to the beam 51, to a point 55 intermediate of its length, and during the time the roller is traversing this downwardly-sloping portion the plunger 10 will be forced downwardly by it, thus compressing the material in the opening 13 against the upper end of the plunger 9, which, as before stated, rests solidly at its lower end upon the bracket 35. When the parts reach the point 55 in the revolution of the mold-wheel, the plunger 10 is at the lowermost limit of its stroke, and the lower end of it is level with the top of the mold-cavity, and the stock is now pressed into the space between the four plungers 9, 10, 11, and 12, and it is ready to be compressed to the desired hardness by the action of the compressing-plunger 12.

It will be observed from Fig. 3 that the compressing-plunger 12 is arranged centrally between the teeth 14 of the mold-wheel. This is illustrated also in Fig. 4, which shows the normal or inactive position of the compressing-plunger—that is to say, with its inner face in line with the front wall of the opening 13 and its outer end projecting from the wheel into the free space between the teeth. Before the final compression takes place by the action of the compressing-plunger 12, presently to be described, the resistance-block 11 is retracted to its full inward limit with its inner end finding a firm support upon the flange 5 of the central spider of the mold-wheel, this being due to the fact that the roller 37 on the lower end of the lever 36 has entered the camway 56 of the cam 38 and has reached the point R. At this time the parts are ready for the compression of the material by the plunger 12. I locate an idle gear-wheel 57 on a vertical axle 58, supported by a standard 59. The teeth of this gear mesh with the teeth 14 of the mold-wheel, whereby the gear is rotated idly. It is provided with a smooth rim 60 in line with the outer ends of the plunger 12, and as the mold-wheel revolves and turns the gear-wheel the smooth face of the rim 60 will engage the outer ends of each plunger 12 as it comes around and will force the same inwardly for a part of the distance the said plunger is intended to travel, as it will be noticed that the surface of the plain rim 60 does not reach all the way into the bottom of the teeth of the mold-wheel 14. This action gives a partial compression to the material, and in the continued revolution of the mold-wheel the plunger 12, which has been moved part of its stroke inwardly, is brought to a second gear-wheel 61, which turns about a vertical axle 62, suitably supported, and the teeth of this wheel not only engages the teeth 14 of the mold-wheel, to be driven thereby, but said teeth are of a sufficient depth to engage also the ends of the plungers 12 and give them a further movement inwardly to compress the material to a greater degree than that resulting from the action of the gear-wheel 57, above described. The plunger, however, is not yet forced all the way in, as it will be seen that the teeth of the gear-wheel 61 are not quite long enough to reach to the bottom of the teeth 14 of the mold-wheel, and for giving the final compressing action to the plunger 12 I depend upon the driving-gear 15, before described, whose teeth are of sufficient length to force the plunger all the way in, and thus complete the compression of the material to the hardness desired.

Referring to Fig. 3, it will be noticed that the teeth of the driving-gear 15 extend vertically the full thickness of the said gear and of the mold-wheel, so that these teeth not only engage the teeth 14, which, as shown in Fig. 5, are made in upper and lower parts with a space between, into which the plungers project, but said teeth also engage the plungers themselves for forcing them inwardly. This structure is the same as that of gear 61, but differs from that of the gear 57, which has teeth to engage only the upper part of the teeth 14, while its rim engages the plungers. From the point 55, the lowest part of the cam-bar 50, to the point 55', which is directly over the line A B, Fig. 6, the said cam-bar is horizontal and the plunger 10 remains down, and during this time the compressing action of the material into a coherent mass takes place by means of the plunger 12. Immediately after the final compression, however, the roller 54 passes from under the cam-bar 50, and the plunger 10 is now free to rise. At this point also, as will be seen in Fig. 6, the roller 37, controlling the resistance-block 11, leaves the camway 56 of the cam 38 and striking against the outward incline 62 of said cam, thus carrying the lever 36 and the resistance-block outwardly. It will be noticed from the right-hand side of Fig. 2 that the final compression of the material takes place wholly within the opening 7, and as the resistance-block resumes its normal position by moving outwardly the material, which has now been completely compressed into a block, will be moved from the mold-cavity 7 into line with the opening 13, the said block now resting upon the upper end of the plunger 9, before described. When this position of the parts is reached, the plunger 10 is in its uppermost position and the compressing-plunger 12 has moved outwardly to normal position, these actions taking place soon after the said parts are carried across the line A C, Fig. 6, and past the point at which the gear-wheel 15 meshes with the mold-wheel, it being understood that the outward movement of the plunger 12 is due to its release from the tooth of the gear 15 and to the outward movement of the compressed block under the action of the outwardly-moving resistance-block 11. After assuming this normal position the plungers 10, 11, and 12 will remain at rest until the next feeding action of the material is to take place after the block is discharged. This dwell in the movement of the plungers 10 and 11 is due to the fact that the roller 37 is now passing over a dwell or concentric part 63 of the cam 38. The next action in the operation of the machine is the discharge of the completed block, and this begins to take place immediately after the parts have resumed their normal position and is caused by the roller 30, before described, riding up the incline 64 of the cam 31. The plunger 9 is thus raised and the beginning of this upward movement of the plunger takes place when the opening 13 reaches the point $y$ in the revolution of the mold-wheel. The ascent of the plunger is completed when said opening 13 reaches the radial line E C, Figs. 1 and 6, and the position of the parts at this moment is illustrated in Fig. 5, the compressed block being elevated to the upper side of the mold-wheel and resting upon the upper end of the plunger 9, which end is flush with a steel facing-plate $64^\times$, with which the upper side of the mold-wheel is provided. The block is now ready to be thrown from the machine, and this takes place while the roller 30 is traversing the high part or dwell 65 of the cam 31. The discharge is effected by a doffer-wheel 66, having arms 67 with curved ends adapted to engage the blocks and sweep them from the upper surface of the mold-wheel onto a traveling belt 68, Fig. 1. The doffer-wheel is keyed to a vertical shaft 69, journaled in bearings 70, supported by beams or trusses, forming part of the framework of the machine. The doffer-wheel is driven by a wheel or disk 72, keyed to the shaft 69 and having rollers 73 disposed at different points around its periphery to be engaged by the teeth 14 of the mold-wheel, so that the doffer is driven in unison with the mold-wheel. Immediately after passing the doffer-wheel the plunger 9, which has raised the block to be discharged, is depressed by engagement of its roller with the camway 31, and this depression takes place as the said plunger is passing beneath the supply-hopper, which discharges the material into the said opening as the said plunger falls, and from this point the action of the machine is repeated in succession.

Referring to Fig. 5, a slide-bar 88 is provided to move in bearings 89, secured to the under side of the mold-wheel, said slide-bar being connected by a pin and slot 90 with the resistance-block lever 36, the function of said slide being to sustain said lever against the lateral thrust due to the contact of its roller with the cam 38. This slide is extended and engages a lever 90', pivoted at 91 to the bracket 35 and having its upper end engaging a notch 92 in the compressing-plunger 12, so that as the resistance-block returns to normal position (shown in Fig. 4) the slide-bar will operate the lever 90' and move the plunger 12 outwardly, so that said plunger will assume its proper position even though no block be in the mold-cavity or should the block be under size.

It will be understood that there are as many mold-cavities as there are teeth in the mold-wheel, and there is a set of plungers and attendant lever mechanism for each mold. These molds and their sets of plungers and operating-levers are alike in all respects, and the foregoing description, which deals with only one mold and set of mechanism immediately coöperating therewith and carried by the mold-table, answers for all similar parts in the machine.

Referring now to the supporting-framework more particularly, 92' and 93 are standards connected by beams or trusses 94 of channel-iron. 95 is a beam of channel-iron extending from a portable beam 96 to the center of the machine. A beam or truss of channel-irons 97 extends across the top of the machine and is bolted at its ends to the standard 26 on one side, before described, and to a similar standard 26' on the other side of the machine. At 98 an angularly-arranged brace or stay iron is arranged to connect and strengthen parts of the supporting structure. At 99 are illustrated washers through which bolts extend to securely hold certain parts. For instance, in Fig. 2 the bolt 100 extends down between the two channel-irons forming the truss and connects with the bearing 17 to support the same. The cross beam or truss 97, before described, in like manner supports the center bearing 101 by means of bolts 100', extending down between the two channel-irons forming the truss and through ears 102, Fig. 4, formed on said bearing, the said ears being engaged in their lower faces by the bolt-heads. The washers in this instance, through which the bolts extend, are marked 99'. This center bearing 101 is further held rigidly in position by the trusses or beams 52 and 95, before described, which are bolted to ears 103, projecting from the center bearing between the two channel-irons forming each truss or beam. This bearing-block 101 is formed with a cavity in its left side, Figs. 1 and 2, into which fits a sliding block 104, concaved on its inner side to conform to the periphery of the shaft 2. To this sliding or movable section of the center bearing is bolted a strut 105, which is connected at its other end with a buffer-plate 106. In rear of the buffer-plate a resistance plate or standard 107 is arranged, and this has openings near its upper and lower ends on each side, through which tie bolts or rods 108 extend. The buffer-plate is also perforated for the passage of these tie-rods. At their other ends the tie-rods extend through openings in the center bearing-block 101, before described, which is located at the upper part of the shaft 2 of the mold-wheel, and also through a similar center block $101^\times$, located near the lower end of the shaft. These tie-rods have nuts 109 on their ends bearing upon the resistance-plate and bearing-blocks 101, respectively, so that these parts are tied together. The lower center bearing-block is combined with a sliding section or box $104^\times$, arranged in a manner similar to that above described in connection with the center bearing 101 and the movable section 104, and this lower sliding section is connected with the buffer-plate by a strut $105^\times$ in a manner similar to that of the upper sliding section, and it is also connected with the standard 18 by trusses or beams $55^\times$. The buffer and resistance plates 106 107 are heavily ribbed to afford the maximum amount of strength, and they are supported upon a sole-plate 110. They have between them a series of springs 111, which offer a powerful yielding resistance to the movement of the buffer-plate 106. The springs are under strong compression, and thus the pressure exerted through the struts 105 105× pushing the movable blocks 104 104× to the right and also exerted through the tie-bars to pull the center blocks 101 101× to the left will cause the mold-wheel shaft 2 to be firmly gripped and held stationary by the said blocks.

As described hereinbefore, the final compression of the block takes place when the compressing-organs arrive in position directly over the line A C, Fig. 6, or in line with coincident radii of the mold-wheel and its drive-gear. Here is seen a line of metal extending from the drive-shaft 16 to the mold-wheel shaft 2, broken only by the block of material being compressed. This line of force is made up of the parts 15 12, the block, the plunger 11, the flange 5, the spider-arm 3, the hub 4, and the mold-wheel shaft 2. These parts are under a heavy strain at the movement of compression, and this strain must be resisted; but at the same time provision must be made to make the resistance a yielding one to guard against breakage of the parts should an overcharge of material get into the mold-cavity or some incompressible substance be contained in the material. I accomplish this result by the arrangement above described, the strain of final compression being transmitted through the movable sections 104 104× of the center bearing and the upper and lower struts to the spring-held buffer-plate 106, thence to the resistance-plate 107 and tie-rod 108. In these it becomes a tensile strain and is transferred to the rigid center bearings 101 101× and from here through the trusses or beams 52 52× to the standard 18, in which the drive-shaft 16 is journaled.

In case an overcharge of material or an incompressible substance gets into the mold-cavity the force of compression exerted through the parts before mentioned will force the mold-wheel, with its shaft, to the left as a whole, the sliding sections 104 104× of the center bearing moving and transmitting the movement through the struts to the buffer-plate 106, which now yields the required amount by the yielding action of the springs. As soon as the mold containing this substance moves away from the line of final compression and the excessive pressure is relieved the springs 111 return all the parts to their normal position again, ready for the compression of the material in the next mold-box when it comes in line with the centers of the mold-wheel and the drive-gear. No interruption of the movement of the machine takes place, as it automatically compensates for differences in the amount of charge to be compressed and for the presence of incompressible bodies.

The platform 34, which carries the cams 31 and 38 for operating the plungers, rests on foundation-piers 113 114; but it is not fastened to them in any way. It also rests on a short beam 114′, having a feather or tongue 115, which extends into a groove in the platform, so as to allow the same sliding movement toward and from the spring resistance-plate 107, but prevents rotary movement of the platform. This feather is directly under the line A B C, so that the platform can move slightly along the line of strain, together with the mold-wheel, when excessive pressure is brought to bear on the compressing members of the machine. By this construction the position of the cams 31 and 38 in relation to the compressing elements is maintained in all positions of the mold-wheel. The beam 114 rests on the lower trusses 55×, of channel-iron, which connect the standard 18 with the center bearing 101. The hub of the mold-wheel passes through an opening 116 in the platform, an antifriction metal ring being interposed between the hub of the mold-wheel and the platform. The cam-bar 50 is supported by hangers from the beams and also by a brace-bar 118, connected thereto at 119 and itself supported by the beams 95 and 97. The downward movement of the plunger 10 is limited by a shoulder 10′ thereon striking the upper surface of the mold-wheel. The plungers 11 are recessed on their sides, so that the sides of the levers 36 can pass down between them and the sides of the cavities in which said plungers slide.

From the foregoing it will be seen that I provide a continuously-rotating mold-wheel carrying radially-arranged plungers and operating means for the said plungers moving in unison with the continuously-rotating mold, said means comprising the wheel engaging the ends of the plungers and the lever mechanism carried by the mold-wheel.

I claim as my invention—

1. In combination, a mold-carrier having teeth, plungers projecting between the teeth and a toothed wheel meshing with the teeth of the carrier and operating the plungers, substantially as described.

2. In combination, a mold-carrier, plungers carried thereby, said mold-carrier having mold-cavities at the inner ends of the plungers, a wheel for operating the mold-carrier, said wheel also operating the said plungers inwardly by engaging the ends thereof to press the material in the mold-cavities and means for discharging the compressed material from the mold-cavities, substantially as described.

3. In combination a mold-carrier having teeth, plungers in the mold-carrier and a toothed wheel meshing with the teeth of the mold-carrier whereby movement is transmitted from one to the other, said wheel having also a plain peripheral portion to engage said plungers, substantially as described.

4. In combination in a machine for making artificial-stone blocks and the like, a rotating toothed mold-wheel having compressing-plungers radially arranged between the teeth and a second wheel having teeth to mesh with the teeth of the mold-wheel and to engage and operate the compressing-plungers, substantially as described.

5. In combination with a mold-wheel having teeth with radial plungers between the teeth and a drive-gear, the teeth of which mesh with those of the mold-wheel to drive the same and operate the plungers, substantially as described.

6. In combination with a mold-wheel having teeth and plungers radially arranged between the teeth, means for driving the mold-wheel and an idle wheel having teeth to mesh with those of the mold-wheel and operate the plungers, substantially as described.

7. In combination with a mold-wheel having teeth radial plungers between the teeth and a plurality of toothed wheels meshing with the teeth of the mold-wheel for operating the plungers, substantially as described.

8. In combination, a continuously-rotating mold-wheel carrying radially-arranged compression-plungers 11 and 12 having plain ends and operating means therefor, moving in unison with the continuously-rotating mold-wheel, substantially as described.

9. In combination, a mold-wheel having a central spider with a flange 5, and a rim carried by said flange, and radially-movable plungers 11 and 12 with operating means therefor, said plunger 11 finding a bearing against the flange 5 when the compression takes place, substantially as described.

10. In combination, a rotary mold-carrier, a pair of plungers to compress the material between them in the mold, a second pair of plungers operating at right angles to the compressing-plungers before compression takes place, all of said plungers being carried by the mold-carrier to move therewith, and operating means for the plungers, substantially as described.

11. In a horizontal mold-wheel, radial plungers carried thereby, a pair of vertically-arranged plungers, one operating from above and the other from below the mold-wheel and a hopper for supplying the material from above the mold-wheel, substantially as described.

12. In combination, a mold-carrier having horizontal mold-cavities, a hopper under which the carrier moves, vertical openings extending to the mold-cavities, a plunger operating in the vertical opening and a compressing-plunger operating in the mold-cavity, substantially as described.

13. In combination, a mold-carrier, a pair of horizontal plungers 11 and 12, a lever for operating the plunger 11, a cam for operating the said lever, a vertically-arranged plunger 10, connections thereto from the lever of the plunger 11 and independent means for operating the said plunger 10, substantially as described.

14. In combination, a mold-carrier having vertical openings with the mold-cavities 7 to one side of the said vertical openings, a plunger 11 operating in the mold-cavity, a compressing-plunger 12 arranged to cross the line of the vertical opening to operate in the said mold-cavity, a hopper above the mold-wheel, having its discharge-mouth in line with the path of the vertical openings, and a plunger working in the said vertical opening, said plunger together with the plunger 11 operating by suction to draw in a charge of material and a fourth plunger 10 with means for operating the same into and out of the vertical opening, substantially as described.

15. In combination, a toothed mold-carrier, plungers 12 projecting between the teeth, a toothed wheel to mesh with the teeth of the mold-carrier to operate the plungers, a plunger 11 coöperating with the plunger 12 to compress the material between them and vertically-operating plungers 9 and 10, cams for operating the same and a cam and lever for operating the plunger 11, substantially as described.

16. In combination, a moving mold-carrier having vertical openings, a fixed hopper having its mouth directed to the upper ends of the said vertical openings, a plunger for sucking a charge of material into the the mold-carrier, means for lowering the said plunger as it is passing beneath the mouth of the hopper, and compressing means independent of the sucking-plunger, substantially as described.

17. In combination, a moving mold-carrier having openings therein with compressing means, a fixed hopper having a discharge-spout directed to said openings and plunger means operated to suck the material into the carrier, with means for operating the said plunger as it is passing the said spout, substantially as described.

18. In combination, a mold-carrier having vertical openings, compressing means on the mold-carrier and a hopper having a discharge-foot extending laterally from the hopper over the upper surface of the mold-carrier, said foot being open on its under side and presenting a wall inclined to the direction of movement of the carrier to direct the material to the openings, said material resting on the solid part of the table out of line with said openings, substantially as described.

19. In combination, a mold-carrier, a pair of horizontally-moving plungers therein, a vertically-moving plunger and a discharge-wheel for throwing off the blocks when raised by the vertically-moving plunger, substantially as described.

20. In combination, a toothed mold-carrier, a pair of plungers 11 and 12, a toothed wheel for operating the plungers 12, a cam and lever for operating the plunger 11 and means for operating the plunger 12 outwardly, substantially as described.

21. In combination, a toothed mold-carrier, a pair of plungers 11 and 12, a toothed wheel for operating the plungers 12, a cam and lever for operating the plunger 11 and means for operating the plunger 12 outwardly, said means comprising a rod 88 connecting with the said lever and a lever 90 connected with the plunger 12 and engaged by the said rod, substantially as described.

22. In combination, a mold-carrier, plungers 11 radially arranged in said mold-wheel, levers for operating the plungers, said plungers being cut away laterally for engagement with the levers and plungers 12 coöperating with the plungers 11, substantially as described.

23. In combination, a mold-wheel, plungers 11 and 12 operating therein horizontally, a vertically-operating plunger 9, a cam for operating the same and a supporting-bracket for the said plunger upon which it rests when down, substantially as described.

24. In combination, a mold-carrier, compressing-plungers carried thereby, means for operating the compressing-plungers and means for yieldingly supporting the mold-carrier together with the said operating means for the compressing-plunger, substantially as described.

25. In combination, a mold-wheel, carrying radial compressing-plungers, a compressing-wheel acting against said plungers and yielding supporting means for one of said wheels, substantially as described.

26. In combination, a mold-wheel carrying plungers, a shaft supporting the said mold-wheel, a divided bearing for the said shaft, a yielding support for one section of the said bearing the other section being fixed and means for pressing the plungers, substantially as described.

27. In combination, a mold-wheel carrying plungers, a shaft for the mold-wheel, a yielding bearing-block for the said shaft, a buffer-plate, an abutment-plate, springs between the plates and a connection between the yielding bearing and the buffer-plate, substantially as described.

28. In combination, a mold-wheel having teeth, compressing-plungers projecting between the teeth and a compressing-wheel, a standard having bearings for said wheel, a shaft upon which the mold-wheel is supported, a fixed bearing-block 101 for said shaft, a truss connecting the fixed block with the standard of the compressing-wheel, a yielding bearing-block 104, a buffer-plate connected therewith, an abutment-plate, springs interposed between the said abutment-plate and buffer-plate and means connecting the abutment-plate with the fixed bearing-block, substantially as described.

29. In combination, a mold-wheel, plungers carried thereby, means for supporting the mold-wheel yieldingly, cams for operating the plungers and a platform for said cams arranged to move with the yielding of the mold-wheel, substantially as described.

30. In combination, a toothed mold-wheel having plungers projecting between the teeth, a toothed wheel for engaging the teeth of the mold-wheel, said toothed wheel having a plain portion for operating the plungers, substantially as described.

31. In combination, a mold-carrier, a series of plungers and means for giving each of said plungers successive compressing movement for each block made, said means comprising a series of wheels, substantially as described.

32. In combination, a pair of plungers to compress the material between them, a second pair of plungers operating at right angles to the compressing-plungers, supporting means for the plungers having a feed-opening therein for the material, the said second pair of plungers having movement in said feed-opening, substantially as described.

33. In combination, a pair of compressing-plungers, a second pair of plungers operating at right angles thereto and means for operating one of the compressing-plungers across the line of movement of the second pair of plungers so that the compression will take place in the mold-cavity beyond the line of the second pair of plungers, means for operating the remaining compressing-plunger to force the compressed material in the line of movement of the second pair of plungers and means for operating the second pair of plungers, substantially as described.

34. In combination, a pair of compressing-plungers, a second pair of plungers operating at right angles to the compressing-plungers and means for operating the compressing-plungers whereby the compressing will take place out of the line of movement of both of the second pair of plungers, substantially as described.

35. In combination, a mold-carrier, plungers carried thereby, a wheel for exerting a compressing force in the molds, said mold-carrier and wheel rotating continuously and in unison and yielding controlling means for one of the parts whereby excessive pressures are relieved during the continuous rotation of the mold-carrier.

36. In combination, a continuously-moving mold-carrier, plungers carried by said continuously-moving mold-carrier and a wheel acting on the plungers as the carrier moves continuously to force said plungers inwardly, said mold-carrier having mold-cavities at the inner end of the plungers in which the material is compressed by the inward movement of the plungers, substantially as described.

In testimony whereof I affix my signature in presence of two witnesses.

ERVIN W. STEVENS.

Witnesses:
ANDREW G. MCFARLAND,
JOHN LE BURKERT.